United States Patent
Yammine et al.

(10) Patent No.: US 10,355,278 B2
(45) Date of Patent: Jul. 16, 2019

(54) BINDER BASED ON A SOLID MINERAL COMPOUND RICH IN ALKALINE-EARTH METAL OXIDE WITH PHOSPHATE-CONTAINING ACTIVATORS

(71) Applicant: SAINT-GOBAIN WEBER, Servon (FR)

(72) Inventors: Joumana Yammine, Rosny Sous Bois (FR); Zahia Toutou-Melinge, Montmorency (FR)

(73) Assignee: SAINT-GOBAIN WEBER, Servon (FR)

( * ) Notice: Subject to any disclaimer, the term of this patent is extended or adjusted under 35 U.S.C. 154(b) by 105 days.

(21) Appl. No.: 15/538,009

(22) PCT Filed: Dec. 21, 2015

(86) PCT No.: PCT/FR2015/053689
§ 371 (c)(1),
(2) Date: Jun. 20, 2017

(87) PCT Pub. No.: WO2016/102867
PCT Pub. Date: Jun. 30, 2016

(65) Prior Publication Data
US 2017/0362123 A1    Dec. 21, 2017

(30) Foreign Application Priority Data

Dec. 23, 2014 (FR) ..................................... 14 63231

(51) Int. Cl.
| | | |
|---|---|---|
| C04B 7/24 | (2006.01) |
| H01M 4/02 | (2006.01) |
| C04B 12/04 | (2006.01) |
| C04B 28/02 | (2006.01) |
| H01M 4/60 | (2006.01) |
| C04B 28/08 | (2006.01) |
| C04B 7/153 | (2006.01) |
| C04B 22/16 | (2006.01) |
| C08G 73/02 | (2006.01) |
| H01G 11/06 | (2013.01) |
| H01G 11/50 | (2013.01) |
| H01G 11/52 | (2013.01) |
| H01G 11/60 | (2013.01) |
| H01G 11/62 | (2013.01) |
| H01G 11/86 | (2013.01) |
| H01M 4/62 | (2006.01) |
| H01M 4/66 | (2006.01) |
| H01M 4/74 | (2006.01) |
| H01M 10/0525 | (2010.01) |
| H01M 10/0568 | (2010.01) |
| C04B 103/12 | (2006.01) |

(52) U.S. Cl.
CPC ............. *H01M 4/606* (2013.01); *C04B 7/153* (2013.01); *C04B 7/243* (2013.01); *C04B 22/16* (2013.01); *C04B 28/021* (2013.01); *C04B 28/08* (2013.01); *C08G 73/0266* (2013.01); *H01G 11/06* (2013.01); *H01G 11/50* (2013.01); *H01G 11/52* (2013.01); *H01G 11/60* (2013.01); *H01G 11/62* (2013.01); *H01G 11/86* (2013.01); *H01M 4/623* (2013.01); *H01M 4/625* (2013.01); *H01M 4/669* (2013.01); *H01M 4/747* (2013.01); *H01M 10/0525* (2013.01); *H01M 10/0568* (2013.01); *C04B 2103/12* (2013.01); *H01M 2004/028* (2013.01); *Y02P 40/143* (2015.11); *Y02P 40/145* (2015.11)

(58) Field of Classification Search
CPC ....... C04B 28/021; C04B 28/08; C04B 22/16; C04B 7/153; C04B 7/243; C04B 2103/12; C08G 73/0266; H01G 11/06; H01G 11/50; H01G 11/52; H01G 11/60; H01G 11/62; H01G 11/86; H01M 4/606; H01M 4/623; H01M 4/625; H01M 4/669; H01M 4/747; H01M 10/0525; H01M 10/0568; H01M 2004/028
See application file for complete search history.

(56) References Cited

U.S. PATENT DOCUMENTS

| | | |
|---|---|---|
| 5,082,501 A | 1/1992 | Kurz |
| 5,409,063 A * | 4/1995 | Cowan .................... C04B 22/16 106/790 |
| 5,553,670 A | 9/1996 | Cowan |

(Continued)

FOREIGN PATENT DOCUMENTS

| | | |
|---|---|---|
| EP | 1 188 727 A1 | 3/2002 |
| EP | 2 514 727 A2 | 10/2012 |

(Continued)

OTHER PUBLICATIONS

LaFarge NewCem Material Safety Data Sheet, pp. 1 to 6 (Year: 2011).*

(Continued)

*Primary Examiner* — Anthony J Green
(74) *Attorney, Agent, or Firm* — Oblon, McClelland, Maier & Neustadt, L.L.P.

(57) ABSTRACT

A hydraulic binder includes at least 70% by weight of a solid mineral compound consisting of at least one mixture of silica, alumina and alkaline-earth metal oxides, the total sum of CaO and MgO representing at least 10% by weight of the solid mineral compound, and an activation system of which at least 30% by weight is a phosphoric acid-derived salt. Construction products can obtained from a mortar composition including such a binder.

17 Claims, 4 Drawing Sheets

(56) References Cited

U.S. PATENT DOCUMENTS

| | | |
|---|---|---|
| 8,236,098 B2 * | 8/2012 | Ramme .................. C04B 7/1535 106/624 |
| 2002/0053305 A1 | 5/2002 | Gouvenot et al. |
| 2011/0232532 A1 | 9/2011 | Ramme et al. |

FOREIGN PATENT DOCUMENTS

| | | |
|---|---|---|
| KR | 10-2013-0128559 A | 11/2013 |
| WO | 2010/130582 A2 | 11/2010 |

OTHER PUBLICATIONS

International Search Report dated Apr. 22, 2016 in PCT/FR2015/053689 filed Dec. 21, 2015.

* cited by examiner

BINDER BASED ON A SOLID MINERAL COMPOUND RICH IN ALKALINE-EARTH METAL OXIDE WITH PHOSPHATE-CONTAINING ACTIVATORS

CROSS-REFERENCE TO RELATED APPLICATIONS

The present application is a national stage application of International Patent Application No. PCT/FR2015/053689, filed Dec. 21, 2015, which claims priority to French Patent Application No. 1463231, filed Dec. 23, 2014, the entire contents and disclosure of each of which are incorporated herein by reference.

The present invention relates to a hydraulic binder rich in calcium oxide and/or magnesium oxide, activated by at least one compound of phosphate type, and also to construction materials obtained from such binders.

With the objective of decreasing the amounts of $CO_2$ discharged into the atmosphere, it is today increasingly sought to replace a part or all of the Portland cement used in the manufacture of concrete and mortar with other hydraulic binders considered to be less polluting. Hydraulic binders are thus known in which a part or all of the Portland cement is replaced with waste from the steel or coal industry, such as blast furnace slags or fly ash. Contrary to Portland cement, these compounds are by nature not very hydraulic and it is necessary to add an activator in order to dissolve them and to make them reactive. It is known practice to use alkaline agents in large amount, or else of which the alkalinity is high, which has the drawback of causing large increases in pH which make such binders difficult to handle and risk causing strong irritations. The solution proposed in application WO 2011/055063 consists of a milder alkaline activation since very small amounts of bases are necessary to activate the system comprising finely ground slag particles. However, this solution is not suitable if the slag is not sufficiently fine and is not totally amorphous. Other systems propose using a combination of several alkaline activators. Mention will be made, for example, of patent EP 2 297 061 which uses as activator a compound of an alkali metal and a zinc salt for a binder system containing casting sand.

The present invention provides a binder comprising at least 70% by weight of a solid mineral compound consisting of at least one mixture of silica, alumina and alkaline earth metal oxides, the total sum of CaO and MgO representing at least 10% by weight of the solid mineral compound, and an activation system comprising at least one phosphate-based compound. The activation system used in the present invention makes it possible to render solid mineral compounds, such as, for example, slags or fly ashes, reactive regardless of their crystallinity. Thus, such a system makes it possible to activate amorphous but also partially crystalline slags, the particle sizes of which can range up to 5 mm.

Figure 1:
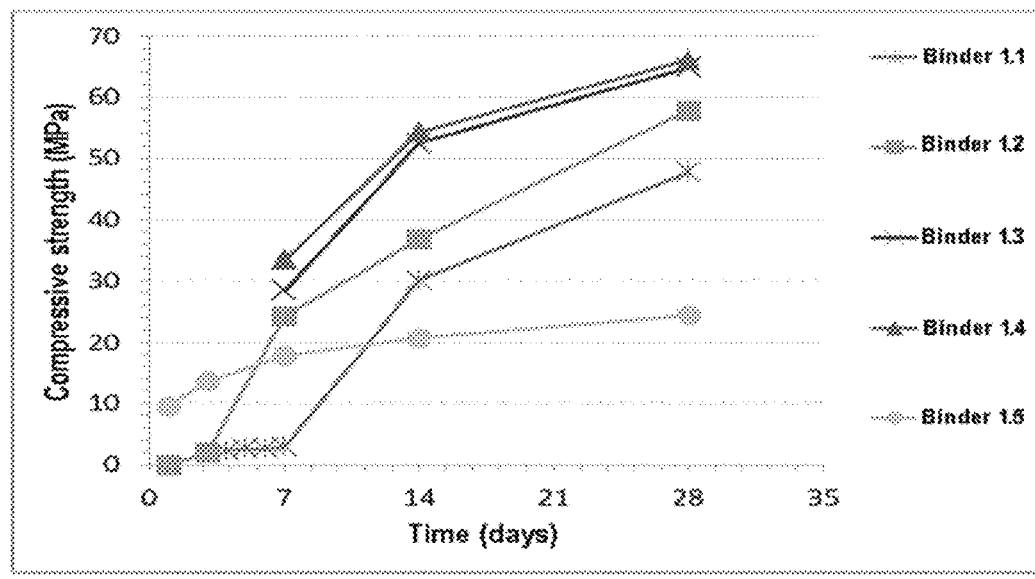
FIG. 1: The evolution of the compressive strength as a function of time for the various binders in Example 1.

For the purposes of the present invention, the term "activation system" is understood to mean a system comprising one or more compounds intended to improve and/or accelerate the setting and/or the curing of the binder, in particular by facilitating the dissolution of its components.

The binders according to the present invention advantageously exhibit a compressive strength which is compatible with the desired applications and in particular which can be equivalent to that obtained with conventional Portland cement. They also have the advantage of being compatible with the regulations in force regarding environmental, hygiene and safety standards since, contrary to binders based on slags or on fly ashes activated with strong bases such as sodium hydroxide which lead to higher pH values.

Preferably, the binder according to the present invention comprises at least 80% by weight of said mineral solid compound.

The activation system used according to the present invention comprises at least 30% by weight of a compound which is a phosphoric acid-derived salt, the weight percentage being given relative to the total weight of the activation system. This salt is chosen from polyphosphates of an alkali metal such as sodium, potassium or lithium and mixtures thereof. Preferably, the activator is an alkali metal diphosphate or triphosphate. Even more preferentially the activator is sodium triphosphate of formula $Na_5P_3O_{10}$. These phosphoric acid-derived salts advantageously make it possible to improve the mechanical strengths of the binders according to the present invention, compared with known activation systems such as the alkaline activation carried out with a mixture of sodium hydroxide and of silicate or such as a mild activation as described in application WO 2011/055063.

For certain applications, it is necessary to have good strengths very rapidly at early ages, i.e. as soon as the mortar or concrete composition obtained using the binder has been applied. The activation system is further improved when it comprises other constituents, in addition to the phosphoric acid-derived salt. The activation system can therefore also comprise, in addition to the phosphoric acid-derived salt, any constituent known to be an activator for slags. Mention may be made, for example, of metal silicates, carbonates and sulphates, of alkali metals and/or of alkaline-earth metals.

Advantageously, the activation system therefore comprises, in addition to the phosphoric acid-derived salt, a silicate of an alkali metal chosen from potassium, lithium and sodium and mixtures thereof. When the silicate is present, its weight content represents between 5% and 70% by weight relative to the total weight of the activation system.

In order to further improve the strengths at early ages, it is also possible to add, to the activation system, a source of alkaline-earth metal and in particular a source of calcium or of magnesium. This compound can be chosen from lime, calcium carbonate, Portland cement, calcium aluminate cement, calcium sulphoaluminate cement, dolomite and magnesium hydroxide and mixtures thereof. Lime is particularly preferred. The source of alkaline-earth metal, when it is present, represents between 5% and 70% by weight relative to the total weight of the activation system.

Furthermore, in order to control the reactivity and the exothermicity of the phosphoric acid-derived salts, the activation system may also comprise a set retarder which is a salt of formula $X^+A^-$ in which the cation $X^+$ is chosen from alkali metals, alkaline-earth metals, aluminium and the ammonium ion, and the anion $A^-$ is chosen from acetate, citrate, formate, benzoate, tartrate, oleate, bromide or iodide anions. Preferentially, the anion of the retarder is an acetate and the cation is chosen from lithium, sodium, potassium, magnesium or calcium. The amount of retarder can represent between 0.1% and 10% by weight of the activation system. For certain applications, it is in fact desirable to be able to increase the workability time of the systems. The presence of a retarder chosen from the compounds mentioned above makes it possible in particular to modify the rheology of the binder.

According to one embodiment, the binder according to the present invention comprises an activation system which consists of a mixture of a phosphoric acid-derived salt and of an alkali metal silicate.

According to another embodiment, the binder according to the present invention comprises an activation system which consists of a mixture of a phosphoric acid-derived salt and of a source of alkaline-earth metal.

According to another embodiment, the binder according to the present invention comprises an activation system which consists of a mixture of a phosphoric acid-derived salt, of an alkali metal silicate and of a source of alkaline-earth metal. Preferentially, the activation system consists of a phosphoric acid-derived salt, of an alkali metal silicate and of a calcium source.

The activation system is added to the binder according to the present invention in an amount ranging between 3% and 30% by weight, preferably between 5% and 25% by weight, relative to the total weight of binder.

The binder according to the present invention is essentially based on a solid mineral compound consisting of at least one mixture of silica, alumina and alkaline-earth metal oxides, the total sum of CaO and MgO representing at least 10% by weight of the solid mineral compound. Preferably, the total sum of CaO and MgO represents at least 20% of the weight of the solid mineral compound. Preferentially, said solid mineral compound is an amorphous or crystalline slag, fly ashes and/or glass powders. The slags may be steelmaking slags or blast furnace slags. The fly ashes are preferentially class C fly ashes.

The binder according to the invention may also comprise other types of binders, for instance Portland cement, high-alumina cement, sulphoaluminate cement, belite cement, cement formed of a pozzolanic mixture optionally comprising flyash, silica fume, calcined schist, natural or calcined pozzolans, a source of calcium sulphate, such as plaster or hemihydrate, gypsum and/or anhydrite. When they are present, these binders represent less than 27% by weight relative to the total weight of binder.

The binder according to the invention is advantageously used in combination with fillers, sand such as quartz, limestone, wollastonite, metakaolin, ground glass, rockwool, glass wool or dolomite, or else sands and granulates derived from deconstruction concretes. It can also be used with fillers of low density such as expanded clay, expanded perlite, aerogels, vermiculite, expanded polystyrene, expanded glass granulates, and granulates resulting from the recycling of worn tyres.

Other additives conferring particular properties can also be added and be part of the composition of the binder. The content of each of the additives represents less than 1% by weight of the binder. Mention will, for example, be made of rheological agents, water-retaining agents, air-entraining agents, thickening agents, foaming agents, agents which protect against microorganism and/or bacterial growth, dispersing agents, pigments, retarders, accelerators, and also other agents for improving the setting, the curing and the stability of the products after application and in particular for adjusting the colour, the workability, the processing or the impermeability.

The binder according to the present invention may also comprise adjuvants such as plasticizers, for example products based on polycarboxylic acids and preferably on polycarboxylic ethers, lignosulphonates, polynaphthalene sulphonates, superplasticizers based on melamines, polyacrylates and/or vinyl copolymers, typically in contents of less than or equal to 10% by total weight of binder. It may also comprise polymers such as cellulose ethers.

Likewise, it may comprise adjuvants such as polymers in liquid form and/or in redispersible powder form, typically in contents of less than or equal to 10% by total weight of binder.

Again likewise, it may comprise anti-foam or surfactant agents, hydrophobic agents, surfactants or surface agents and/or corrosion inhibitors, typically in contents for each of these agents of less than or equal to 1% by total weight of binder.

A subject of the present invention is also a concrete composition or a mortar, comprising at least one hydraulic binder as described above. Such a composition is obtained by mixing the binder described above with granulates, sands and/or aggregates in the presence of water. The granulates or sands added to the binder depend in particular on the nature of the material that it is desired to obtain. It is usually gravel, sand, dolomite and/or limestone of various particle sizes.

Another subject of the invention relates to the construction products obtained after hydration and curing of said mortar composition. These construction products may be prefabricated elements, bricks, slabs, blocks or coatings comprising at least one hydraulic binder as described above. These materials have very satisfactory curing and very satisfactory mechanical strengths. The activation system contained in the binder makes it possible in particular to improve the short-term curing.

The binders according to the invention can be incorporated into all types of ready-mixed mortar, for instance adhesive mortars, pointing mortars, grouts or adhesives. They can also be used to produce mortars or concretes for floors (floor screed or coating), or for façade mortars or internal or external wall coatings or mineral paints such as smoothing mortars, undercoats, single coats, mortars for rendering impermeable, and also any type of coatings for internal or external use.

The following examples illustrate the invention without limiting the scope thereof.

EXAMPLES

Various standardized mortar formulations were prepared. These formulations comprise 1350 g of standard sand, 450 g of binder, and an activation system. Various binders and activation systems were tested. The results obtained are presented in the form of a curve, giving the compressing strength in MPa of the samples obtained as a function of the time, expressed in days. The amount of activator is indicated in the legends and corresponds to the amount, as weight percentage, which is added to the blast furnace slags and/or to the fly ashes. The amount of water introduced in order to prepare the mortar is 225 g, which corresponds to a water/binder ratio of 0.5.

For each of the formulations, test samples of 4×4×16 cm$^3$ are produced according to the protocol below:
- the powders of slag and/or fly ashes and the pulverulent components constituting the activation system are premixed with the sand for 1 min at low speed (600 rpm);
- water is added and mixed at low speed (~600 rpm) for 30 sec, followed by mixing at high speed (~1500 rpm) for 2 min 30 s;
- the resulting mortar is cast in a mould, and
- after curing, the mortar is removed from the mould and the mechanical strength is measured (3-point bending then compression), according to standard NF EN 196-1 (August 1995).

The compressive strength measurements are carried out for all the samples at various times during the curing phase in order to monitor the evolution as a function of time.

By way of comparison, identical measurements were carried out on formulations comprising:
- 100% of Portland cement CEM I 52.5 (which comprises 95% of clinker),
- 100% of CEM III 32.5 cement which is a cement formed from a mixture comprising 70% of blast furnace slag and 30% of clinker,
- 100% of a virtually amorphous blast furnace slag (Ecocem) or 100% of class C fly ashes with an activation system of alkaline activation type consisting of a mixture of sodium hydroxide NaOH (VWR) and of sodium silicate $Na_2SiO_3$ (Metso 510 from PQ corporation), predissolved in water so as to ensure complete dissolution of this mixture and, consequently, total effectiveness thereof as an activator,
- 100% of an Ecocem slag activated by a mild activation system as described in patent application WO 2011/055063 and comprising slag microparticles and a small amount of base (composition described in Table 1 of the example).

Various slags or fly ashes were tested in the examples hereinafter. Their respective composition and the amount of amorphous compounds contained in each of the products are given in the table below. It will be noted that the Carmeuse slag is a highly crystalline slag.

|  | CARMEUSE slag | Fos-sur-Mer ECOCEM slag | Merit 5000 slag (Merox) | Class C fly ashes |
|---|---|---|---|---|
| $SiO_2$ | 10.10 | 37.22 | 33.90 | 34.10 |
| CaO | 45.70 | 42.37 | 30.80 | 25.00 |
| $Al_2O_3$ | 2.40 | 10.41 | 13.40 | 17.30 |
| MgO | 6.28 | 8.49 | 16.50 | 4.48 |
| $TiO_2$ | 0.59 | 0.53 | 2.15 | 1.00 |
| $Fe_2O_3$ | 26.40 | 0.60 | 0.40 | 5.02 |
| $K_2O$ | 0.10 | 0.34 | 0.50 | 0.39 |
| $Na_2O$ | 0.05 | <0.20 | 0.55 | 1.55 |
| $P_2O_5$ | 1.61 | 0.02 | 0.01 | 0.51 |
| MnO | 4.30 | 0.25 | 0.45 | 0.07 |
| $SO_3$ | 0.18 | — | 3.70 | 1.36 |
| $S^{2-}$ | — | 0.89 | — | — |
| % amorphous content | 16 | 99.3 | 96.3 | ~95% |

Example 1

Four formulations of binders according to the invention comprising Ecocem slag were prepared as described above, while varying the amount of sodium tripolyphosphate (NaTPP) used as activator. The binder 1.5 corresponds to the comparative.

Binder 1.1: 93% by weight of Ecocem slag and 7% by weight of NaTPP.
Binder 1.2: 90% by weight of Ecocem slag and 10% by weight of NaTPP.
Binder 1.3: 88% by weight of Ecocem slag and 12% by weight of NaTPP.
Binder 1.4: 75% by weight of Ecocem slag and 25% by weight of NaTPP.
Comparative binder 1.5: 78% by weight of Ecocem slag, 11% by weight of NaOH and 11% by weight of $Na_2SiO_3$, the sodium hydroxide and the sodium silicate being predissolved in water before being mixed with the slag with a water/binder ratio=0.5.

FIG. 1 represents the evolution of the compressive strength as a function of time for these various binders.

All the binders according to the present invention have a much improved strength after 7 to 14 days, compared with the performance levels obtained with an alkaline activation system. It is thus possible to obtain strengths of greater than 40 MPa after 28 days.

Example 2

Two formulations of binders according to the invention comprising Carmeuse slag, therefore highly crystalline and known to be difficult to activate, were prepared as described above, while varying the amount of sodium tripolyphosphate (NaTPP, VWR) used as activator. The binder 2.3 corresponds to the comparative.

Binder 2.1: 75% by weight of Carmeuse slag and 25% by weight of NaTPP.
Binder 2.2: 88% by weight of Carmeuse slag and 12% by weight of NaTPP.
Comparative binder 2.3: 78% by weight of Carmeuse slag, 11% by weight of NaOH and 11% by weight of $Na_2SiO_3$, the sodium hydroxide and the sodium silicate being predissolved in water before being mixed with the slag with a water/binder ratio=0.5.

Figure 2:
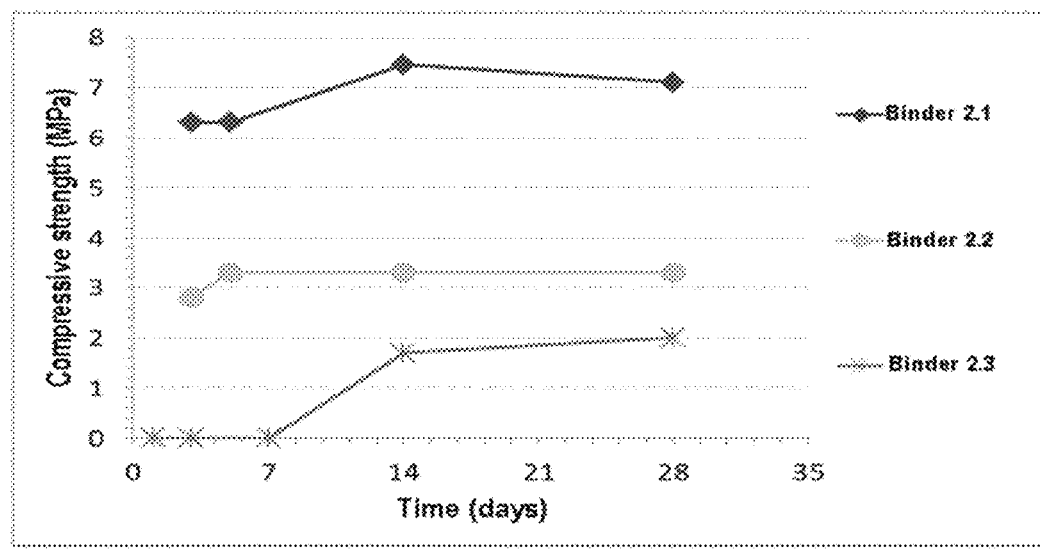
FIG. 2: The evolution of the compressive strength as a function of time for the various binders in Example 2.

FIG. 2 represents the evolution of the compressive strength as a function of time for these various binders.

The binder 2.3 comprising the Carmeuse slag and the conventional alkaline activation system does not bring about short-time setting and no strength is observed before 7 days.

The binder according to the invention makes it possible to improve the strength right from an early age (more than 6 MPa at 3 days for a binder comprising 25% by weight of sodium tripolyphosphate).

Example 3

A formulation of binder according to the present invention with another type of slag was prepared.

Binder 3.1: 88% by weight of Merit slag and 12% by weight of NaTPP.
Comparative binder 3.2: 78% by weight of Merit slag, 11% by weight of NaOH and 11% by weight of $Na_2SiO_3$, the sodium hydroxide and the sodium silicate being predissolved in water before being mixed with the slag with a water/binder ratio=0.5.

Figure 3:
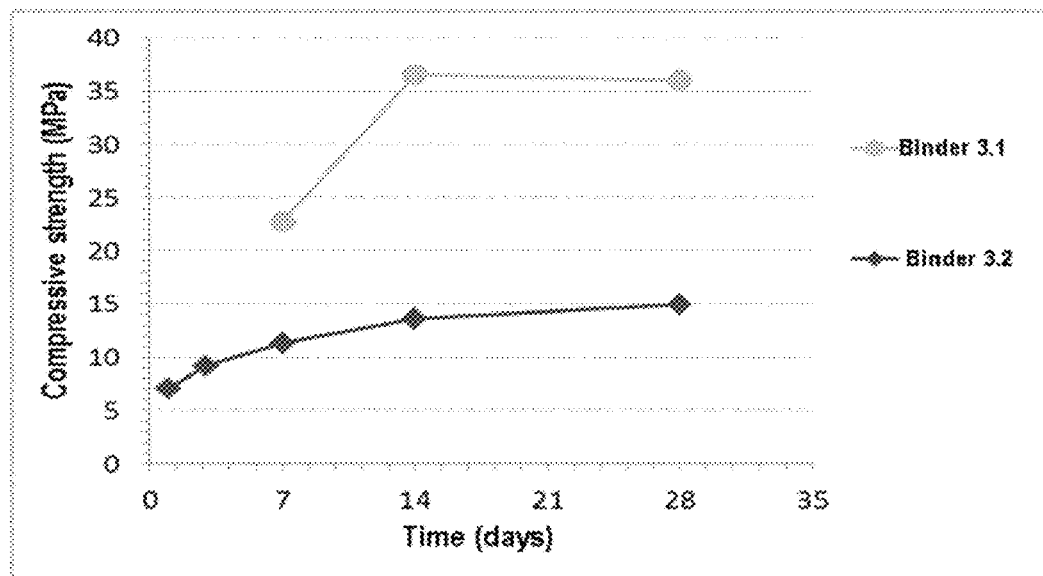
FIG. 3: The evolution of the compressive strength as a function of time for the various binders in Example 3.

FIG. 3 represents the evolution of the compressive strength as a function of time for these various binders.

The binder according to the present invention exhibits improved strengths compared with those obtained with an alkaline activation system.

Example 4

Two formulations of binder based on class C fly ashes according to the present invention were prepared.

Binder 4.1: 75% by weight of class C fly ash and 25% by weight of NaTPP.

Binder 4.2: 88% by weight of class C fly ash and 12% by weight of NaTPP.

Comparative binder 4.3: 78% by weight of Merit slag, 11% by weight of NaOH and 11% by weight of $Na_2SiO_3$, the sodium hydroxide and the sodium silicate being predissolved in water before being mixed with the slag with a water/binder ratio=0.5.

Figure 4:
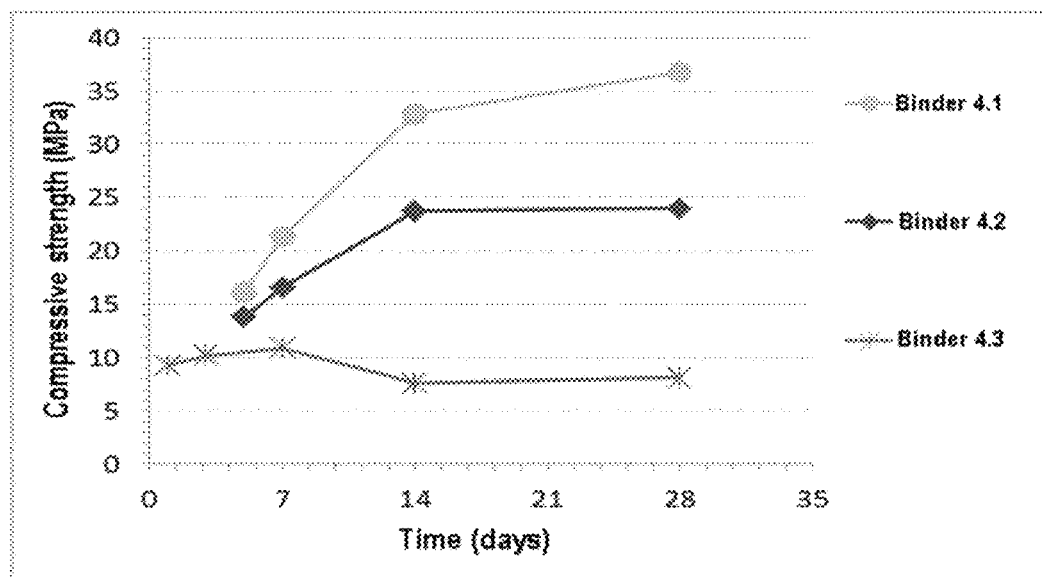
FIG. 4: The evolution of the compressive strength as a function of time for the various binders in Example 4.

FIG. 4 represents the evolution of the compressive strength as a function of time for these various binders.

The binders according to the present invention again exhibit much improved strengths compared with those obtained with an alkaline activation system.

Example 5

Two formulations of binders according to the present invention were prepared, with different activation systems.

Binder 5.1: 86% by weight of Ecocem slag, 10% by weight of NaTPP and 4% by weight of sodium silicate (Metso 510, PQ corporation).

Binder 5.2: 84% by weight of Ecocem slag, 10% by weight of NaTPP, 4% by weight of sodium silicate and 2% by weight of lime (VWR).

Figure 5:
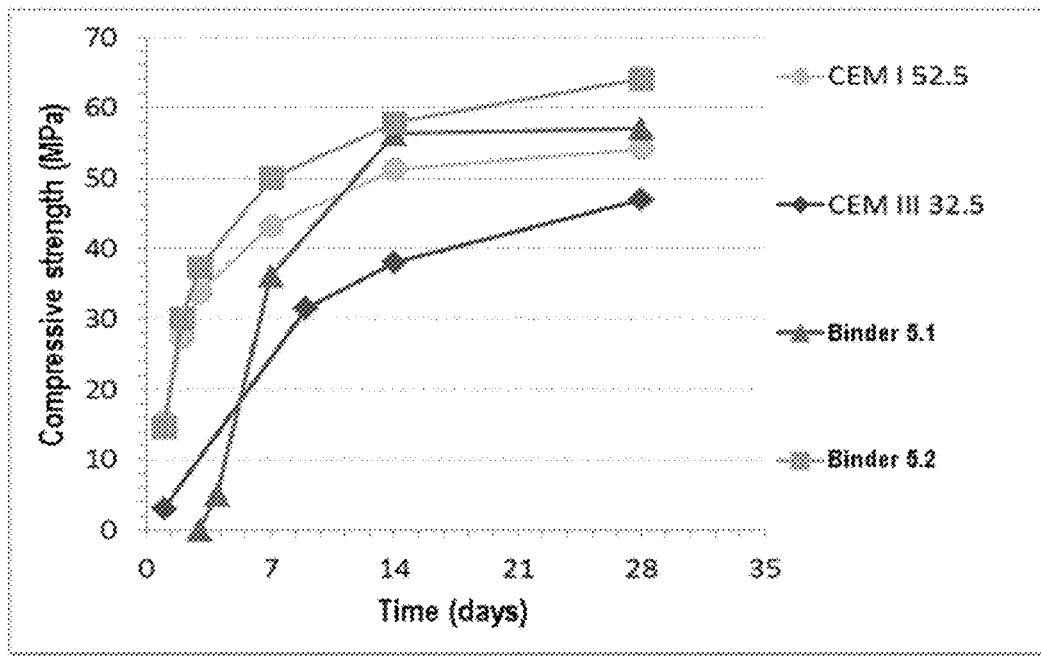
FIG. 5: The evolution of the compressive strength as a function of time for the various binders in Example 5.

These binders are compared to a binder of CEM I 52.5 type (comparative binder 5.3) and to a binder of CEM III 32.5 type containing at least 70% of blast furnace slag (comparative binder 5.4). FIG. 5 represents the evolution of the compressive strength as a function of time for these various binders.

The compressive strengths obtained with the binders according to the present invention are entirely comparable to those which are obtained with a binder of CEM I type and are higher after 7 days for the binder 5.2.

Example 6

Two formulations of binders according to the present invention were prepared and are compared to a binder formulation in which the activation system is of "mild alkaline" type as described in application WO 2011/055063.

Binder 6.1: 84% by weight of Ecocem slag, 10% by weight of NaTPP, 4% by weight of sodium silicate and 2% by weight of lime (VWR).

Binder 6.2: 89% by weight of Ecocem slag, 4.5% of NaTPP, 4.5% by weight of sodium silicate and 2% by weight of lime.

Comparative binder 6.3: 80% by weight of Ecocem slag and 20% by weight of a mixture of activators which includes in particular slag microparticles, as described in WO 2011/055063.

Figure 6:
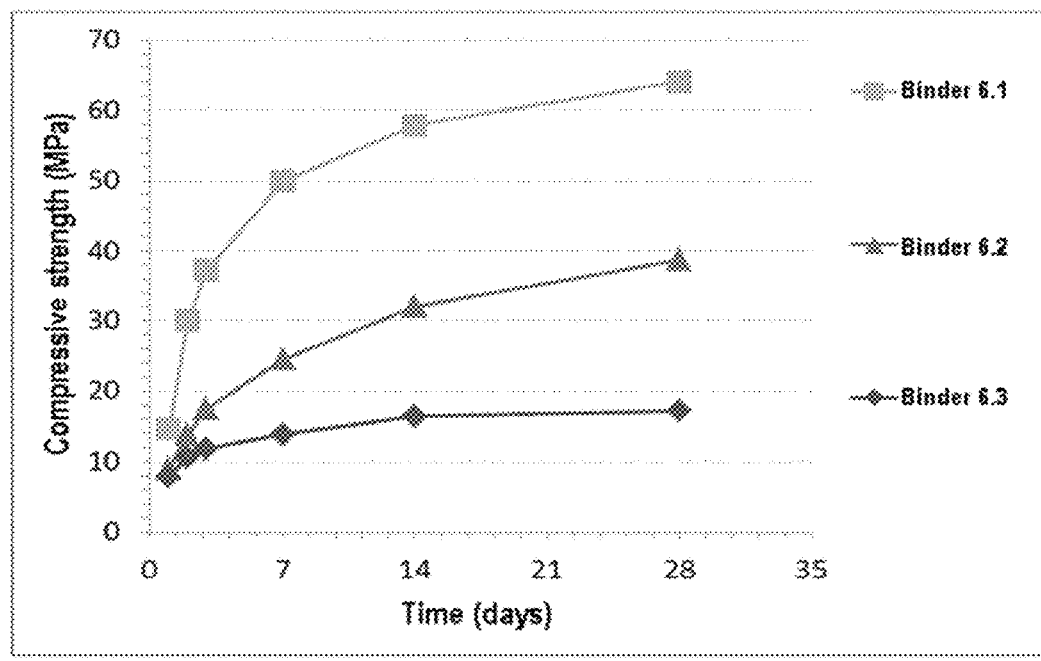
FIG. 6: The evolution of the compressive strength as a function of time for the various binders in Example 6.

FIG. 6 represents the evolution of the compressive strength as a function of time for these various binders.

The compressive strengths of the binders according to the present invention are much improved compared with a binder for which the activation is obtained with slag microparticles, in the presence of a small amount of base. It is also noted, when comparing the strengths of the binders 6.1, 6.2 and 6.3, that the activation system comprising lime makes it possible to improve the mechanical properties at an early age. By comparing the strengths of the binders 6.2 and 6.3, it is noted that, even at a reduced amount of activator, the mechanical properties remain higher than the mild activation system which includes a mixture of activators, in particular slag microparticles.

Example 7

The following formulations were prepared:

Binder 6.1: 84% by weight of Ecocem slag, 10% by weight of NaTPP, 4% by weight of sodium silicate and 2% by weight of lime (VWR).

Binder 7.1: 83% by weight of Ecocem slag, 10% by weight of NaTPP, 4% by weight of sodium silicate, 2% by weight of lime (VWR) and 1% of potassium acetate.

Binder 7.2: 82% by weight of Ecocem slag, 10% by weight of NaTPP, 4% by weight of sodium silicate, 2% by weight of lime (VWR) and 2% of potassium acetate.

Setting time tests were carried out on the basis of the sinking of a Vicat needle into the mortar according to standard NF EN 196-3. The measurement of the evolution of the degree of sinking is characteristic of the evolution of the curing and of the setting of the material.

Figure 7:
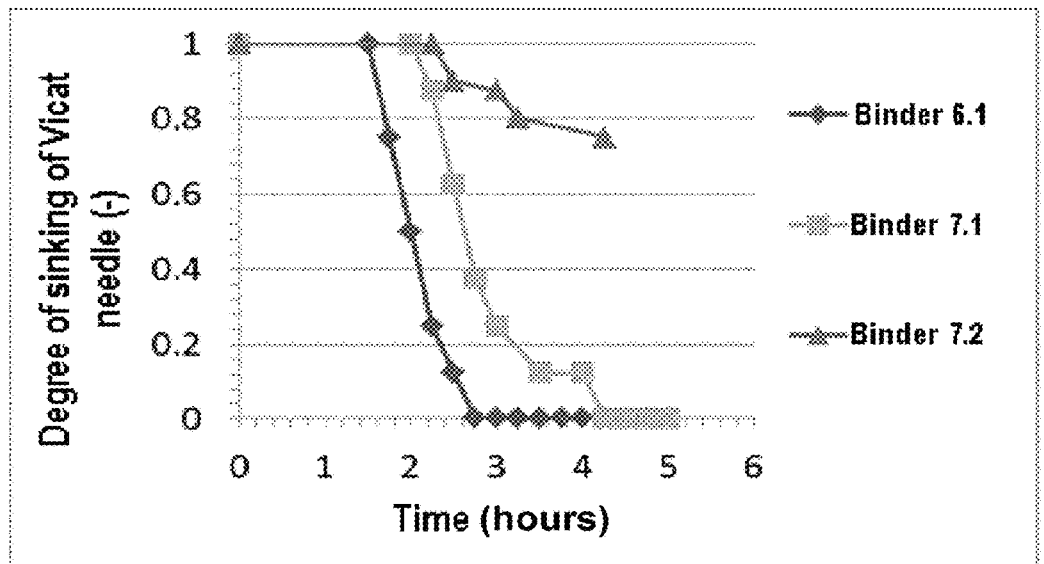
FIG. 7: The degree of sinking of Vicat needle as a function of time for the various binders in Example 7.

FIG. 7 represents the degree of sinking of the Vicat needle as a function of time. The various curves represented in this figure show that the addition of potassium acetate delays the setting of the binder. The greater the amount of retarder added, the greater the delay in setting.

Spreading tests consisting in causing the mortar to spread under its own weight after raising a metal cone containing the mortar were carried out, in accordance with standard EN1015-3 which describes the determination of consistence of a fresh mortar paste with a flow table.

Figure 8:
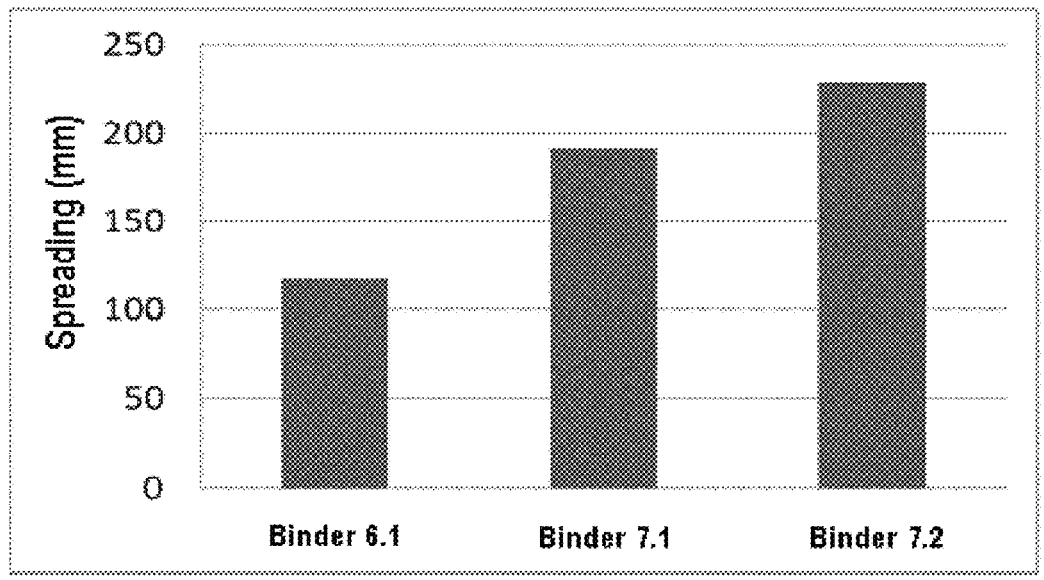
FIG. 8: The spreading of mortar (mm) for the various binders in Example 7.

The results obtained are represented in FIG. 8 which shows that the addition of potassium acetate increases the spreading of the mortar, all the more so the higher the amount of retarder in the formulation.

The invention claimed is:

1. A hydraulic binder comprising:
   at least 70% by weight of a solid mineral compound consisting of at least one mixture of silica, alumina and alkaline-earth metal oxides, the total sum of CaO and MgO representing at least 10% by weight of the solid mineral compound, and
   an activation system of which at least 30% by weight is a phosphoric acid-derived salt, wherein the activation system comprises a mixture of the phosphoric acid-derived salt, an alkali metal silicate, and a source of alkaline-earth metal.

2. The binder according to claim 1, wherein the solid mineral compound comprises at least 20% by weight of CaO and/or MgO.

3. The binder according to claim 1, wherein the solid mineral compound is chosen from amorphous or crystalline slags, fly ashes and/or glass powders.

4. The binder according to claim 1, wherein solid mineral compound is chosen from steelmaking slags, blast furnace slags and class C fly ashes.

5. The binder according to claim 1, wherein said phosphoric acid-derived salt is chosen from polyphosphates of an alkali metal chosen from sodium, potassium or lithium and mixtures thereof.

6. The binder according to claim 5, wherein said phosphoric acid-derived salt is a triphosphate or a diphosphate of an alkali metal.

7. The binder according to claim 1, wherein the alkali metal silicate is a silicate of an alkali metal chosen from potassium, lithium and/or sodium, and wherein the alkali metal silicate is present in an amount ranging from 5% to 70% by weight relative to the total weight of the activation system.

8. The binder according to claim 1, wherein the source of the alkaline-earth metal is selected from the group consisting of Portland cements, calcium aluminate cements, calcium sulphoaluminate cements, lime, calcium carbonate, dolomite and magnesium hydroxide, and mixtures thereof, and
wherein the source of the source of the alkaline-earth metal is present in an amount ranging from 5% to 70% by weight relative to the total weight of the activation system.

9. The hinder according to claim 8, wherein the source of alkaline-earth metal is lime.

10. The binder according to claim 1, wherein the activation system consists of mixture of the phosphoric acid-derived salt, the alkali metal silicate, and the source of alkaline-earth metal.

11. The binder according to claim 1, wherein the activation system further comprises between 0.1% and 10% by weight, relative to the total weight of the activation system, of a retarder of formula $X^+A^-$ in which the cation $X^+$ is chosen from alkali metals, alkaline-earth metals, aluminium and the ammonium ion, and the anion $A^-$ is chosen from acetate, citrate, formate, benzoate, tartrate, oleate, bromide or iodide anions.

12. The binder according to claim 1, wherein the activation system represents between 3% and 30% of the total weight of the binder.

13. The binder according to claim 1, further comprising:
a positive amount of less than 27% by weight, relative to the total weight of hinder, of at least one selected from the group consisting of Portland cement, high-alumina cement, sulpho-aluminate cement, belite cement, cement formed of a pozzolanic mixture, silica fume, calcined schist, natural pozzolans, calcined pozzolans, and a source of calcium sulphate.

14. The binder according to claim 10, wherein the source of alkaline-earth metal is a calcium source.

15. The binder according to claim 12, wherein the activation system represents between 5% and 25% of the total weight of the binder.

16. A concrete or mortar composition, comprising:
a mixture of granulates, sands and/or aggregates and at least one binder according to claim 1 in the presence of water.

17. A construction product comprising:
at least one selected from the group consisting, of an adhesive mortar, a pointing mortar, a grout, an adhesive, a screed, a floor coating, a façade mortar, an internal wall coating, an external wall coating, a mineral paint, a smoothing mortar, an undercoat, and a single coat,
wherein the construction product is obtained by hydrating and curing the concrete or mortar composition according to claim 16.

* * * * *